United States Patent Office 3,091,654
Patented May 28, 1963

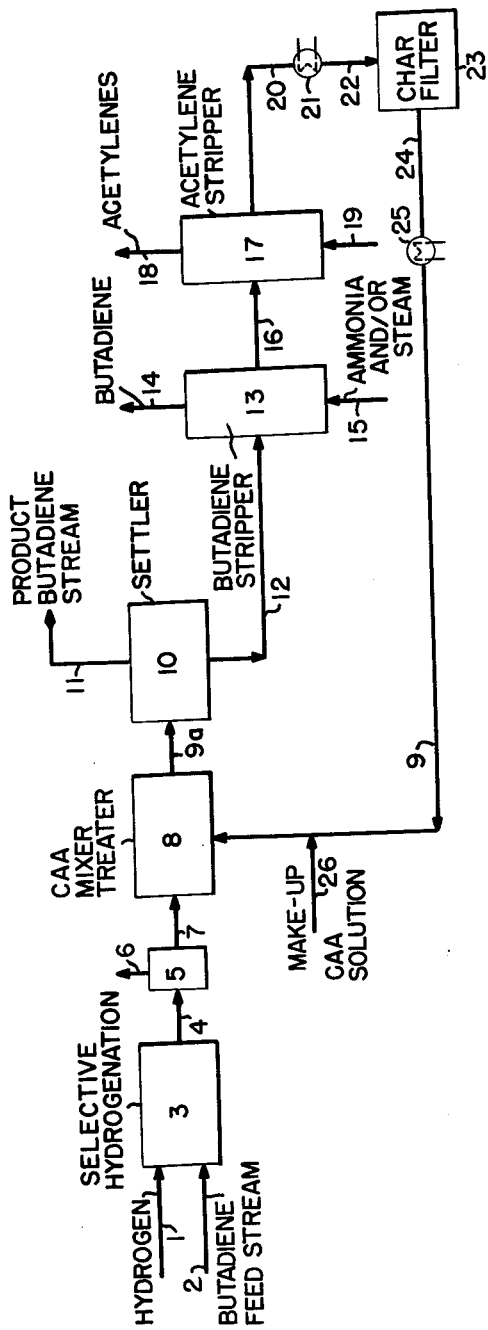

3,091,654
PARTIAL HYDROGENATION OF $C_4$ ACETYLENES PRIOR TO CAA PREWASH
William Newton Kestner, Baton Rouge, La., assignor to Esso Research and Engineering Company, a corporation of Delaware
Filed Aug. 24, 1960, Ser. No. 51,581
9 Claims. (Cl. 260—681.5)

The present invention relates to an improved pretreat process for the removal of acetylenes from a butadiene-1,3-bearing hydrocarbon stream prior to the main extraction of the butadiene therefrom. More particularly this invention relates to the selective removal of these acetylenes from the butadiene feed by a combination of selective hydrogenation of vinyl acetylene followed by prewashing with cuprous ammonium acetate (CAA) solution to remove alkyl acetylenes. Yet more particularly, this invention relates to first conducting an extremely mild selective hydrogenation on the feed stream (to remove substantial amounts of vinyl acetylenes without any substantial hydrogenation of butadiene) and then prewashing with cuprous ammonium acetate solution to remove the remainder of the acetylenes from the diolefin stream. Most particularly this invention relates to such a selective removal of acetylenes from butadiene wherein additionally the desorbing and stripping of the acetylenes from the rich CAA solution (prior to recycling this material back to prewash process) is conducted at low temperatures so as to prevent undesirable polymerization.

Processes for removing acetylenes from butadiene extraction feed streams are made necessary since acetylenes are absorbed more strongly than butadiene (by the aqueous cuprous ammonium acetate solution used in the diolefin extraction units). Thus, these acetylenes are not completely desorbed during the desorption of butadiene and tend to build up in the solvent solution. These acetylenes polymerize and the polymers cause foaming of the solvent solution, emulsification of hydrocarbons in the solution leading to build-up of polymer emulsion layers at acetylene interfaces, and otherwise detrimentally affect the process. Additionally, of course, these acetylenes which are desorbed degrade the butadiene product. In the prior art acetylenes are conventionally selectively removed from butadiene extraction system feeds by prewashing with a relatively small amount of feeds followed by desorbing and stripping the CAA solution followed by desorbing and stripping the acetylenes from the solution prior to the recycle of the lean solution to the process. Although it has been disclosed in the prior art that alternatively selective hydrogenation may be used to remove acetylenes, by far the most important commercial use is of the CAA extraction process. Thus, the selective hydrogenation has been found usually to cause the hydrogenation of too large an amount of diolefins along with the acetylenes to make it commercially attractive.

It has now been discovered that by combining a first hydrogenation process with a following CAA extraction process advantages are obtained over those obtained using either process alone. It has now been discovered that (1) in both mild and severe selective hydrogenations vinyl acetylenes are hydrogenated from the feed at several times the rate at which alkyl acetylenes are removed, and (2) in CAA extraction processes ethyl acetylenes are stripped from spent CAA solution about ten times faster than vinyl acetylenes. Thus, a selective hydrogenation to remove only vinyl acetylenes may be conducted under conditions so mild that essentially no loss of butadiene is incurred. Likewise, the following CAA extraction process is much improved since much cooler conditions may be used in the stripping of acetylenes from the spent CAA solution whereby far less polymer is formed.

Additionally, in a preferred embodiment, it is possible to obtain the absorption of alkyl acetylenes into the CAA solution at higher temperatures than where both vinyl and alkyl acetylenes are required to be absorbed. Thus, less refrigeration or no refrigeration at all is required in the process. It should be noted that a room temperature absorption of acetylenes is economic even if higher than ordinary ratios of CAA to pretreat are required since any additional recycle will of course be obtained without refrigeration costs, and since the stripping of the alkyl acetylenes under mild conditions is inexpensively obtained.

The butadiene-1,3 streams free of acetylenes from the pretreat process after concentration are utilized in the manufacture of various polymers. These streams for polymer manufacture must be essentially free, i.e., contain less than 200 to 1000 p.p.m. total methyl acetylene, ethyl acetylene, vinyl acetylene and propyl acetylene. Since these purity requirements are continually being raised the present invention is particularly timely.

An extremely important advantage of the present process is that presently existing commercial installations can be economically modified by merely adding a simple hydrogenation pretreat step to eliminate having to greatly reduce throughputs to obtain low acetylene levels. This lowering of feed rates formerly was the only way known to obtain the low acetylene levels desired. The present invention provides a simple method for satisfactorily solving the problem of obtaining very low acetylene levels in presently existing equipment operated at original design throughputs.

Diolefin feed streams are obtained both from steam cracking and from butene dehydrogenation as well as from refinery light ends. It is preferred to remove acetylenes prior to concentration of these feeds by extraction rather than after concentration since acetylenes are extremely deleterious in the extraction process itself.

The present invention will be more clearly understood from a consideration of the accompanying drawing describing diagrammatically a system for carrying out this invention. Hydrogen and the butadiene bearing feed stream are supplied through lines 1 and 2 respectively to hydrogenation reactor 3. Suitable butadiene bearing feed streams which may be processed according to this invention and the levels of acetylenes before and after processing are described below:

| | General | Preferred | Specific |
|---|---|---|---|
| Butadiene, percent | 5–99+ | 25–45 | 35 |
| Olefins, percent | 1–95 | 52–70 | 60 |
| Paraffins, percent | 1–50 | 3–10 | 5 |
| Vinyl Acetylenes in Feed Stream, percent | .02–10 | .05–1.0 | .2 |
| Ethyl Acetylenes in Feed Stream, percent | .002–1 | .01–.1 | .05 |
| Vinyl Acetylenes in Product Stream, percent | .000–1.0 | .000–0.1 | .01 |
| Ethyl Acetylenes in Product Stream, percent | .001–0.9 | .005–.07 | .06 |

Conditions to be utilized in the hydrogenation step in the present process are temperatures in the range of −10 to 450° F., preferably −10 to 100° F., specifically 55° F., pressures in the range of 0 to 1000, preferably 100 to 1000, specifically 175 or 225 p.s.i.g., and contact times of .01 to 60 minutes, preferably 2 to 10 minutes, specifically 6 minutes. Both liquid phase and vapor phase hydrogenation may be used, although liquid phase low temperature operations are preferred since low temperatures are required in the following CAA prewash. The amount of hydrogen to be used is generally in the range of .2 to 10 mol percent on feed, preferably .5 to 4 mole percent on feed, specifically 1.2 mol percent on feed. More specifically, it is preferred to utilize 1 to 1.5, e.g., 1.1 times the stoichiometric amount of hydrogen required to convert the vinyl acetylenes to diolefins.

In general, suitable hydrogenation catalysts for use in this invention may contain active nickel, cobalt, copper, platinum and palladium or mixtures of these metals with themselves or other metals such as iron, zinc, cadmium, chromium, silver, etc. Both colloidal and non-colloidal catalysts may be used. Colloidal catalysts are especially valuable in the case of palladium, and also platinum. The catalytic contact masses may be prepared in any suitable way and may be used alone, or supported on, or mixed with inert materials. Suitable promotors may be added to the catalytic masses for enhancing the catalytic properties of such masses. Preferred catalysts which may be used in the present invention are in general noble metal catalysts, preferably platinum or palladium. These catalysts may be utilized alone or preferably disposed on a suitable carrier such as alumina, silica or mixtures of these compounds. Preferably, these catalysts are heat desurfaced catalysts having low surface areas in the range of about 1 to 200 m.$^2$/gm., preferably about 75 to 125 m.$^2$/gm., e.g. 100 m.$^2$/gm. The amount of metal disposed on the carrier surface is in the range of 0.1 to 10 weight percent, preferably .5 to 5 weight percent, e.g. 2 weight percent. A preferred catalyst to be used in a liquid phase hydrogenation is a heat desurfaced catalyst containing 0.5 to 5 weight percent palladium on extruded pure alumina. A preferred catalyst to be used in vapor phase operations is an 85–99 weight percent copper, 0.1–15 weight percent nickel catalyst supported on alumina, diatomaceous earth, etc. Additional catalyst supports that may be used are charcoal, clay, glass beads, etc.

The hydrogen used in the process may be supplied in the pure state or it may be supplied as a dilute stream containing also varying amounts of low molecular weight hydrocarbons and/or nitrogen. Thus, for dilute streams, hydrogen content should be in the range of 50 to 95 mol percent. Such streams are cheaply available, as for example, from hydroforming operations. It should be noted, however, that with the preferred catalysts of the present invention that it is preferred that the hydrogen-containing gas contain less than 10 p.p.m. of carbon oxides.

In a preferred embodiment selective hydrogenation is conducted by preabsorbing the desired amount of hydrogen in liquid feed in a separate vessel prior to the hydrogenation vessel and then supplying only this liquid feed containing absorbed hydrogen to the hydrogenation reactor. The method for carrying out such a process is described in U.S. patent application Serial No. 31,820, filed May 26, 1960, which is hereby incorporated by reference.

In all of these hydrogenations, conditions are chosen to obtain removal of a major portion of the vinyl acetylenes. Preferably, at least 60%, yet more preferably 80%, e.g. 85% vinyl acetylene removal is obtained.

From the hydrogenation reactor 3, the substantially vinyl acetylene free stream is passed through line 4 to pressure release drum 5. Here any excess hydrogen is desorbed overhead through line 6 and the stream is then passed through line 7 after cooling, if required, to CAA mixer-treater 8 wherein CAA solution is supplied through line 9.

The cuprous ammonium acetate solution is used in proportions of from 0.1 to 4.0, preferably 0.1 to 0.4, specifically 0.2 lbs. of aqueous CAA solution per pound of feed to obtain the removal of a major portion of the acetylenes without removing any substantial amount of the butadiene present in the feed. By "without removing any substantial amount" is mean removing less than 7.5 wt. percent, preferably less than 5 wt. percent, e.g. less than 3 wt. percent of the butadiene present in the feed. Typical CAA solutions may contain .05 to .35 mol/liter cupric copper, 1.5 to 3.5 mols/liter cuprous copper, 8.0 to 12.0 mols/liter of ammonia, and 4.0 to 7.0 mols/liter acetate (as acetic acid). Temperatures used may be in the range of 20–100° F. in one embodiment, preferably 30–60° F., e.g. 40° F. utilizing conventional ratios of CAA to feed; and in another embodiment preferably 60 to 100° F., utilizing higher than ordinary ratios of CAA to feed. Thus in the former embodiment these ratios of CAA to feed are preferably 0.1:1 to 0.4:1, e.g. 0.2:1 and in the latter case 0.4:1 to 3.0:1, preferably 1.0:1 to 3.0:1, e.g. 2.0:1.

The CAA-hydrocarbon mixture from treater 8 is then passed through line 9a to settler 10. Here the treated butadiene stream is passed overhead through line 11 and the CAA solution is passed through line 12 to stripping facilities to remove acetylenes before being recycled to the process. In a preferred embodiment this stripping is conducted in more than one vessel so as to first separate in stripper 13 the small amounts of butadiene absorbed in the CAA solution. Thus this butadiene is recovered through line 14 relatively free of acetylenes for recycle to the feed stream or sale as such. Stripping is conducted utilizing either heat alone, ammonia, or steam and ammonia supplied through line 15, the steam being supplied to provide direct heating of the CAA solution. Following the separate removal of butadiene the CAA solution is passed through line 16 to acetylene stripper 17. Here acetylenes are stripped overhead through line 18 by ammonia and/or steam supplied through line 19. Reaction conditions utilized in these stripping operations are temperatures in the range of 100 to 240° F., preferably 120 to 200° F., e.g. 180° F., and pressures of 3 to 45 p.s.i.a., preferably 15 to 25 p.s.i.a., e.g. 16 p.s.i.a. In the system described in the drawing where more than one stripping zone is utilized, temperatures and pressures for these zones may be as follows:

| | General | Preferred | Specific |
|---|---|---|---|
| Zone 13: | | | |
| Temperature, °F | 80–150 | 100–130 | 125 |
| Pressures, p.s.i.g | 40–80 | 50–60 | 55 |
| Hold-up time, minutes | 0.5–2 | 1.0–1.5 | 1 |
| Zone 17: | | | |
| Temperature, °F | 175–225 | 195–210 | 205 |
| Pressure, p.s.i.g | 3–20 | 3–5 | 4 |
| Hold-up time, minutes | 0.5–3.0 | 1.0–2.0 | 1.5 |

The amount of stripping gas (if used) supplied is in the range of 1 to 5 gr. mol/liter of CAA solution.

Following stripping the lean CAA solution is passed through line 20, cooler 21, and line 22 to a char percolator zone 23 or other facilities for removing any polymer formed in the process. Such a char percolater may be operated at temperatures of 80 to 180° F., preferably 80 to 110° F., e.g. 90° F.

Following removal of any polymers the lean CAA solution is recycled to the mixer-treater 8 through line 24, chiller 25 and line 9. Any make-up CAA solution required is supplied through line 26.

The present invention will be more fully understood from a consideration of the following example.

EXAMPLE

Run 1—Hydrogenation

A feed obtained from steam cracking of a gas oil containing 38 mol percent butadiene, 60 mol percent butenes, 1 mol percent butanes and 1.0 mol percent other hydrocarbons was hydrogenated under the conditions described below to obtain the results also described below.

|  | a | b | c |
|---|---|---|---|
| Temperature, °F | 186 | 130 | 227 |
| Liquid Space Velocity | 24 | 6 | 32 |
| Hydrogen Partial Pressure | 15 | 52 | 32 |
| Catalyst [a] | 3 wt. percent Pd on Alumina | | |

|  | In Feed | In Hydrogenated Product | | |
|---|---|---|---|---|
| Total Acetylenes, p.p.m. by wt.[b] | | 858 | 1,733 | 2,484 |
| Acetylene Breakdown: [c] | | | | |
| Methyl | 1,145 | 336 | 697 | 885 |
| Percent removal | | 71.3 | 40.5 | 24.3 |
| Ethyl | 890 | 446 | 527 | 686 |
| Percent removal | | 61.6 | 54.7 | 40.9 |
| Vinyl | 1,320 | 0 | 326 | 686 |
| Percent removal | | 100 | 81.6 | 61.3 |

[a] Palladium impregnated on high surface area alumina prepared from aluminum alcoholate.
[b] Total acetylenes determined by the silver nitrate method reported as vinyl.
[c] Acetylene breakdown made by mass spectrometry.

Run 2—CAA Acetylene Removal

The product obtained from the hydrogenation at 227° F. (identified as (c) above) is passed to a CAA prewash system as described in the drawing. The conditions utilized are as follows:

Aqueous CAA prewash solution composition is cupric content 0.3 g.-mole/l., cuprous content 2.82 g.-mole/l., ammonia content 10.60 g.-mole/l., acetate content 6.10 g.-mole/l. The amount of CAA solution supplied to the mixer-treater is 0.2 lb. of CAA solution per pound of feed. Conditions in the mixer-treater are temperatures of 40° F., pressures of 60 p.s.i.g., and contact times of 2 minutes. Conditions in the butadiene stripper 13 are temperatures of 125° F., pressures of 55 p.s.i.g., and holdup times of 1 minute. No stripping gas is supplied. Conditions in the acetylene stripper 17 are temperatures of 180° F., pressures of 4 p.s.i.g., and holdup times of 1.5 minutes. Ammonia is supplied as a stripping gas in an amount of 1 g.-mole/l. of CAA solution. Conditions in the char percolator zone are temperatures of 190 to 200° F., and residence times of 5 hours.

Run 3—CAA Acetylene Removal

A typical plant prewash solution of aqueous cuprous ammonium acetate taken upstream of the acetylene stripper was used to determine the stripping rates of the various acetylides from the solution. This CAA solution had the following content: Cupric content 0.30 g.-mole/l., cuprous content 2.82 g.-mole/l., ammonia content 10.60 g.-mole/l., acetate content 6.10 g.-mole/l.

The said solution had a total acetylene concentration of 0.363 g.-mole/l (said total acetylene concentrations refers to the acetylides and acetylenes absorbed in the solution taken together). The amount of the various "acetylenes" in the CAA solution based on total "acetylenes" was 9.4 wt. percent methyl acetylene, 36.0 wt. percent ethyl acetylene and 54.6 wt. percent vinyl acetylene. This feed stream was stripped in a reactor containing a stirrer revolving at 1630 r.p.m., at a temperature of 30° C., a pressure of 15 p.s.i.a. and utilizing a flow rate of ammonia nitrogen stripping medium of 8.72 v./v./minute (ammonia representing 8% of the total gas utilized). Total acetylenes in the CAA solution were determined after various stripping times. From these data it was found that the major proportion of the alkyl acetylenes were removed in a short period of only about 80 minutes and that the vinyl acetylenes were removed during that period at a rate only one-tenth that of the alkyl acetylenes.

It is to be understood that this invention is not limited to the specific example, which has been offered merely as illustration, and that modifications may be made without departing from the spirit of this invention.

What is claimed is:

1. A process for the removal of vinyl and alkyl acetylenes from a butadiene-bearing stream containing these components in minor proportions, which comprises selectively hydrogenating said butadiene-bearing stream under mild conditions to obtain removal of at least a major portion of the vinyl acetylene and only a minor proportion of the alkyl acetylenes, contacting the hydrogenated butadiene stream with that amount of a cuprous ammonium acetate solution to obtain a selective extraction of at least a major portion of the total acetylenes remaining in the hydrocarbon stream without extracting any substantial amount of the butadiene present therein, separating a spent CAA solution containing absorbed acetylenes, stripping this spent CAA solution to remove a substantial amount of the acetylenes, recycling stripped CAA solution to the extraction process, and recovering as a product from the process a butadiene raffinate stream having a reduced total acetylene content.

2. The process of claim 1 in which the selective hydrogenation of the butadiene-bearing stream is conducted under conditions to obtain removal of more than 60% of the vinyl acetylene present therein.

3. The process of claim 1 in which the selective hydrogenation of the butadiene-bearing stream is conducted under conditons to obtain removal of more than 80% of the vinyl acetylene present therein.

4. The process of claim 1 in which hydrogenation is conducted at temperatures in the range of −10 to 100° F. in the presence of a catalyst containing 0.5 to 5 wt. percent palladium on alumina.

5. The process of claim 1 in which the hydrogenated butadiene stream is contacted with 0.1 to 4.0 lbs. of CAA solution per pound of the butadiene-bearing stream.

6. The process of claim 1 in which the stripping of the spent CAA solution is conducted at temperatures in the range of 100 to 240° F.

7. The process of claim 1 in which the hydrogenated diolefin stream is contacted with cuprous ammonium acetate solution at temperatures in the range of 60 to 100° F., and the stripping of the spent CAA solution is conducted at temperatures in the range of 120 to 200° F.

8. The process of claim 1 in which the hydrogenated diolefin stream is contacted with cuprous ammonium acetate solution at temperatures in the range of 30 to 60° F., and the stripping of the spent CAA solution is conducted at temperatures in the range of 120 to 200° F.

9. A process for the removal of vinyl acetylene and alkyl acetylenes from a butadiene-bearing stream containing these components in minor proportions, which comprises selectively hydrogenating said butadiene-bearing stream under mild conditions in the presence of a 0.5 to 5 weight percent palladium on alumina catalyst to obtain removal of at least 80% of the vinyl acetylenes and only a minor proportion of the alkyl acetylenes, contacting the hydrogenated butadiene stream with 0.1 to 0.4 lb. of CAA solution per lb. of the butadiene-bearing stream at temperatures in the range of 60 to 100° F., to obtain a selective extraction of at least a major portion of the total acetylenes remaining in the hydrocarbon stream without extracting any substantial amount of the butadiene present therein, separating a spent CAA solution containing absorbed acetylenes, stripping this spent CAA solution at low temperatures in the range of 120 to 200° F. to remove a substantial amount of the acetylenes, recycling stripped CAA solution to the extraction process, and recovering as a product from the process a butadiene raffinate stream having a reduced total acetylene content.

References Cited in the file of this patent

UNITED STATES PATENTS

| | | |
|---|---|---|
| 2,320,127 | Hachmuth | May 25, 1943 |
| 2,391,004 | Breuer | Dec. 18, 1945 |
| 2,851,504 | Hogan | Sept. 9, 1958 |
| 2,909,578 | Andersen et al. | Oct. 20, 1959 |
| 2,985,697 | Cahn | May 23, 1961 |
| 3,003,008 | Fleming et al. | Oct. 3, 1961 |